April 28, 1964     J. M. CARPENTER     3,130,953
SELF-SEALING ROTARY VALVE MECHANISM
Filed June 27, 1961     4 Sheets-Sheet 1

John M. Carpenter
INVENTOR.

BY *Oliver A. O'Brien and Harvey B. Jacobson*
Attorneys

April 28, 1964    J. M. CARPENTER    3,130,953
SELF-SEALING ROTARY VALVE MECHANISM
Filed June 27, 1961    4 Sheets-Sheet 2

John M. Carpenter
INVENTOR.

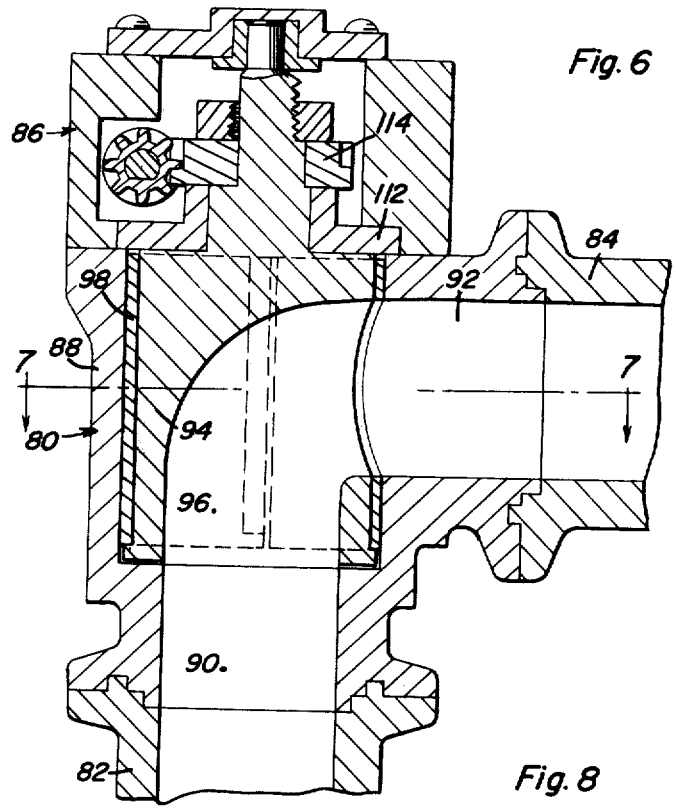
Fig. 6
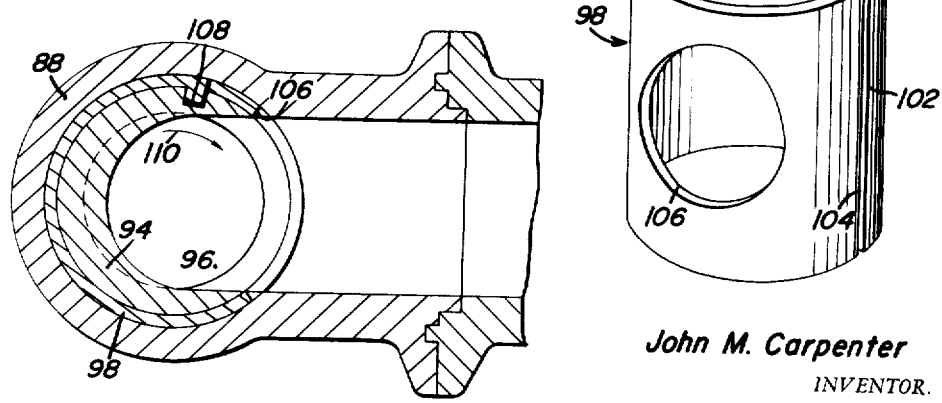
Fig. 7
Fig. 8
John M. Carpenter
INVENTOR.

John M. Carpenter
INVENTOR.

United States Patent Office 3,130,953
Patented Apr. 28, 1964

3,130,953
SELF-SEALING ROTARY VALVE MECHANISM
John M. Carpenter, 10517 Georgetown Drive,
Rancho Cordova, Calif.
Filed June 27, 1961, Ser. No. 120,049
19 Claims. (Cl. 251—182)

This invention relates to a rotary type valve mechanism featuring a novel sealing arrangement between the rotary valve body and the valve seat.

It is therefore a primary object of the present invention to provide a self-sealing device for rotary type valve mechanisms which is automatically operative in response to rotation of the rotary valve body and the pressurization of the chamber formed therewithin to maintain proper sealing between the valve body and the valve seat at all speeds and pressures of the fluid being handled by the valve mechanism.

Another object of this invention is to provide a self-sealing device for rotary valve mechanisms which features a tensioned split sleeve arranged to be engaged with the walls of the valve seat with the proper initial sealing pressure and so mounted on the rotary valve body as to prevent locking of the sealing sleeve to the valve seat when the valve body is rotated and yet maintains the proper sealing pressure.

A still further object of this invention is to provide a self-sealing split sleeve device for rotary type valve mechanisms which is free riding or floating in response to rotation of the rotary valve body and also automatically operative to apply the proper sealing pressure to the valve seat when the fluid chamber within the valve body is pressurized.

In accordance with the foregoing objects, it will be appreciated that the self-sealing split sleeve device of the present invention constitutes an effective sealing member of simple construction and installation performing its sealing function with an unexpected degree of effectiveness. The advantageous attributes of the split sleeve sealing device reside in the particular relative locations of a key formed integral with the sleeve and projecting radially inward therefrom for transmitting rotative torque from the valve body to the sleeve together with an expansion accommodating gap in the sleeve and the location of a port opening formed in the sleeve for periodic alignment with fluid passages in the valve seat housing. Accordingly, the key is received with a loose fit within a longitudinal keyway formed in the valve body and the gap of the sleeve is arranged to avoid a predominating contracting force due to rotational torque and accommodate thereby pressure biased expansion of the sleeve to maintain the proper sealing pressure without binding. The port opening of the sleeve slightly larger than that in the valve body is located with respect to the gap so as to avoid any reduction in the initial sealing bias of the split sleeve and reduce any adverse effect on the sealing action attributed to the internal static pressure within the valve body acting on the sleeve for expansion thereof into sealing relation with the valve body. The split sealing sleeve is mounted on the rotary valve by means of the key and keyway so that the direction of rotation of the rotary valve body will exert a pull on the split sleeve at the leading edge of the key in order to unlock the sleeve from the valve seat housing without relieving the sealing bias of the sleeve for the most part. The significance of locating the valve port opening in the sleeve adjacent to the key where deformation of the sleeve occurs, will therefore be apparent.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a side sectional view of the novel self-sealing rotary valve mechanism applied to another installation.

FIGURE 7 is a sectional view taken through a plane indicated by section line 7—7 in FIGURE 6.

FIGURE 8 is a perspective view of the sealing sleeve device of the present invention.

Figure 9:
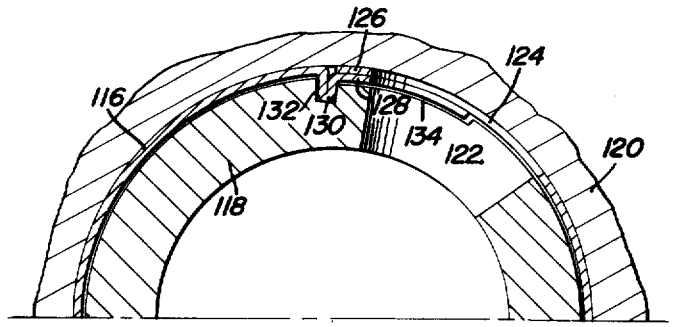
Figure 10:
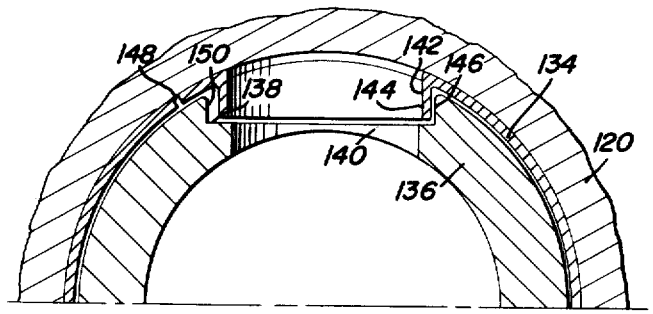
Figure 11:
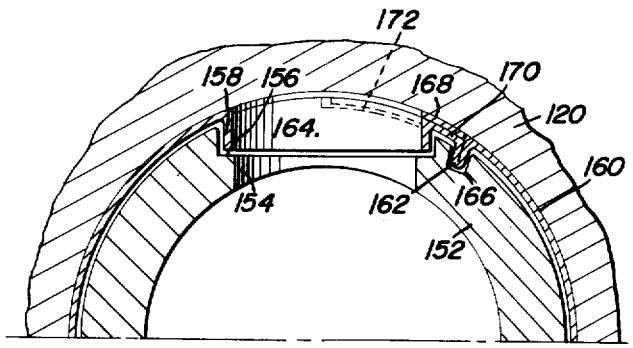

FIGURES 9, 10, and 11 are partial sectional views illustrating modified forms of sealing sleeves and valve body installation.

Figure 1:
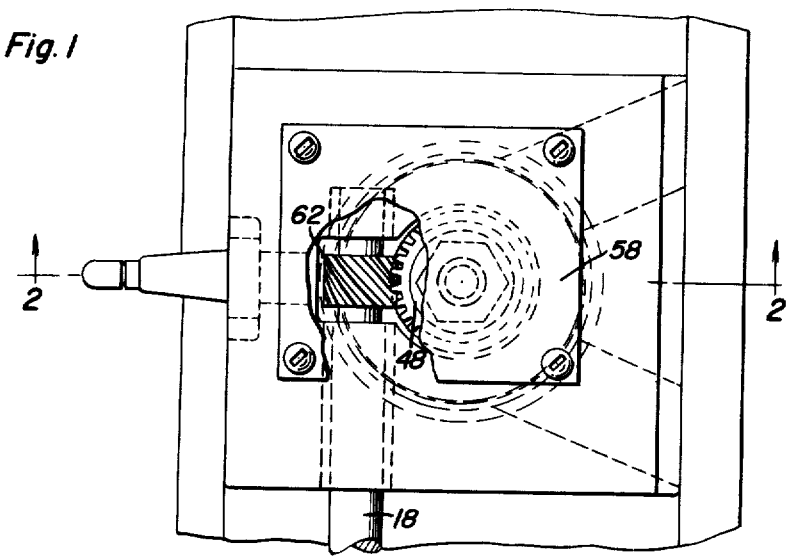
FIGURE 1 is a top plan view with parts broken away showing one installation for the novel self-sealing rotary valve mechanism of the present invention.
Figure 2:
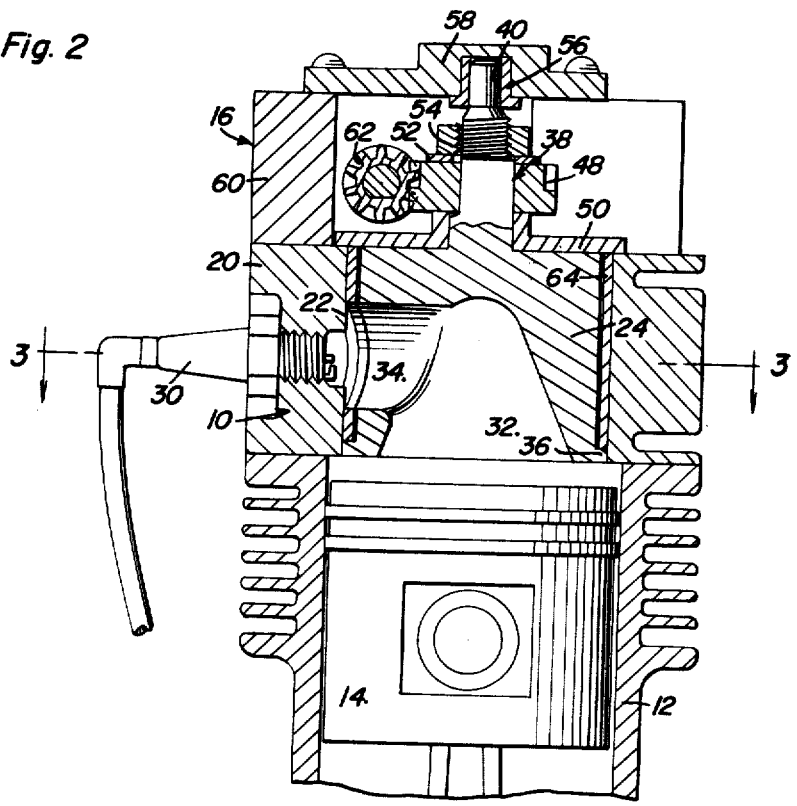
FIGURE 2 is a partial sectional view taken through a plane indicated by section line 2—2 in FIGURE 1.

Referring now to the drawings in detail, FIGURE 2 illustrates the application of the novel-self-sealing rotary valve of the present invention applied to the valve control for an internal combustion type engine. The novel valve mechanism is generally referred to by reference numeral 10 and is shown mounted atop a cylinder 12 of an internal combustion engine having a piston 14 movable there within shown at the upper part of its stroke in FIGURE 2. Mounted above the valve assembly 10 is the valve actuator assembly 16 whereby the valve assembly is drivingly connected to the output of the internal combustion engine crankshaft by means of the drive shaft 18 as more clearly seen in FIGURE 1.

Figure 3:
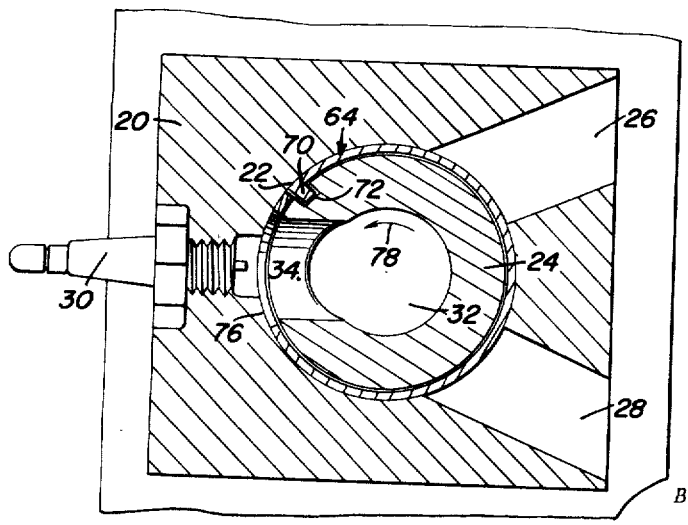
FIGURE 3 is a sectional view taken through a plane indicated by section line 3—3 in FIGURE 2.

The valve assembly 10 includes a valve seat housing 20 which has formed there within a cylindrical bore 22. The rotary valve body 24 is received within the cylindrical bore 22 and is rotated relative thereto in order to provide periodic fluid communication between the cylinder 12 and an intake passage 26 or an exhaust passage 28 formed within the housing 20 as more clearly seen in FIGURE 3. The housing also mounts therewithin a spark plug device 30 timed to ignite the combustible mixture received within a combustion chamber 32 in the rotary valve body 24, which combustion chamber is in communication with the upper portion of the cylinder 12. A connecting passage 34 is also formed within the rotary valve body in order to provide the fluid communication between the combustion chamber 32 and the intake passage 26, exhaust passage 28 and the spark plug 30.

Figure 4:
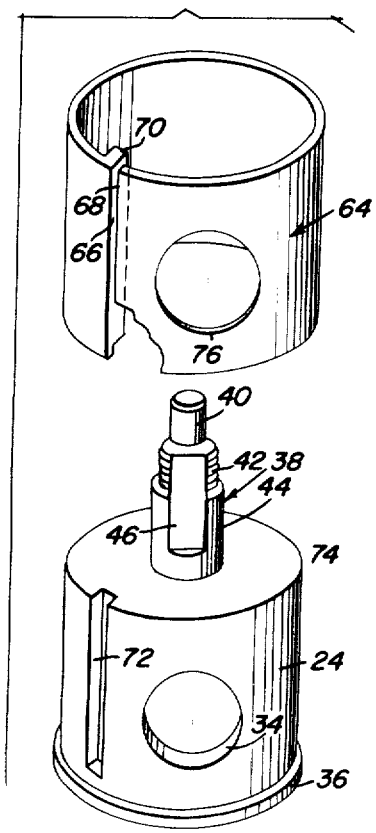
FIGURE 4 is a perspective view of the valve body and sealing sleeve device disassembled from each other.

The valve body 24 as more clearly seen in FIGURE 4, is generally cylindrical in configuration. The lower axial end of the valve body has a shoulder 36 formed thereon while connected to the other axial end is a valve actuating stem 38 including a bearing portion 40, threaded portion 42 and a driven gear mounting portion 44. A flat 46 is therefore formed on the actuating stem 38 for the purpose of rotatably securing thereto a gear element.

Referring to FIGURES 1 and 2, it will be observed that an actuating gear member 48 is mounted on the stem 38. The gear member 48 is axially locked in position above a sealing bearing member 50 by means of the washer 52 and the locknut 54 threadedly mounted on the threaded portion 42 of the stem 38. The bearing portion 40 is journalled within a sleeve bushing 56 secured within the cover plate 58 secured to the gear housing or casing 60 of the actuating drive assembly 16. The actuating gear member 48 is in mesh with a drive gear element 62 rotatably mounted by the gear housing 60 which is connected to the drive shaft 18 for the purpose of imparting continuous rotary movement of the valve body 24 in timed relation to the output of the internal combustion engine with which the rotary valve assembly 10 is associated.

In order to provide sealing between the valve body 24 and the cylindrical bore 22 of the valve seat housing 20, the novel split sealing sleeve generally referred to by reference numeral 64 is provided. The sleeve 64 is of such diameter in its free expanded state as to slightly exceed the bore diameter of the bore 22 so that when the sleeve 64 is installed therewithin, it will be in sealing contact with the walls of the cylindrical bore 22. The sleeve being split includes a gap defined between a leading edge 66 and a trailing edge 68 extending in an axially longitudinal direction along the sleeve. A key element 70 is formed integral with the sleeve and extends radially inward therefrom at slight angle (10°) from the radial direction along the leading edge 66. The key element 70 is therefore adapted to be received with a loose fit having sufficient clearance for accommodating thermal expansion within a keyway 72 formed within the cylindrical valve body 24 for the purpose of rotatably carrying the sleeve 64 therewith. The sleeve 64 extends in an axial direction about the rotary valve body 24 with one axial end thereof being seated on the shoulder 36 while the other axial end is flush with the axial end 74 of the valve body 24. Accordingly, the keyway 72 extends from the axial end 74 and terminates adjacent to but spaced from the lower axial end of the valve body. Formed within the sleeve 64 for alignment with the passage 34 is a sleeve port opening 76. It will be observed that the opening 76 is disposed adjacent to the trailing edge 68 but spaced therefrom. The rotary valve body 24 when rotated will therefore carry the sleeve 64 therewith periodically providing fluid communication between the chamber 32 and the port passages in the housing 20 through the passage 34 and opening 76 in the sleeve 64. The sealing bearing 50 it will be observed, closes the upper axial end of the cylindrical valve seat bore 22 to thereby form a fluid tight sealing arrangement between the valve body and the valve housing seat.

Figure 5:
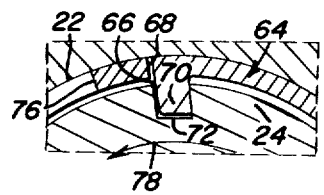
FIGURE 5 is an enlarged partial sectional view illustrating the coaction between the valve body, sealing sleeve and valve seat housing.

Referring now to FIGURE 5, it will be observed that the sleeve 64 will be in sealing contact with the bore 22 with a pressure determined by the tensioning applied to the split sleeve when it is contracted from its expanded diameter for fitting within the bore 22. It will therefore be apparent from FIGURE 5, that the spacing between the valve body 24 and the inner cylindrical surfaces of the sleeve 64 will be subjected to the static pressure of the chamber 32 to exert on the sleeve additional sealing pressure. When the rotary valve member 24 is rotated in the direction indicated by arrow 78, in FIGURE 5, the split sleeve 64 will be pulled by force applied to the rear pulling edge of key 70 inclined slightly relative to the radial direction so as to unlock the sleeve from binding contact with the bore 22 but without relieving the sealing pressure between the sleeve and the bore 22. The advantageous location of the opening 76 adjacent to the trailing edge 68 will also be appreciated from FIGURE 5, since little sleeve distortion occurs at that location as compared to distortion occurring at the pulling edge of the key due to rotational torque applied thereto by the body through keyway 72.

FIGURES 6 through 8 illustrate another installation for the self-sealing valve assembly of the present invention which is generally referred to by reference numeral 80. The valve assembly 80 is accordingly mounted between an inlet conduit 82 and an outlet conduit 84 disposed at right angles to the inlet conduit with a drive actuating mechanism 86 located above the assembly 80 similar to the relative disposition of the drive actuating mechanism 16 and the assembly 10 in FIGURES 1 through 4. The valve housing 88 of the assembly 80 therefore includes an inlet passage 90 and an outlet passage 92. The rotary valve body 94 is therefore provided with an unrestricted flow passage 96 which is in constant communication with the inlet passage 90 but periodically communicates with the outlet passage 92. The valve body 94 is therefore also provided with a self-sealing split sleeve 98 also having a key element 100 disposed along the leading edge 102 and spaced from the trailing edge 104 between which edges the split gap is defined. A port opening 106 is located on the split sleeve adjacent to the trailing edge 104 similar to the arrangement described with respect to FIGURES 1 through 4. The element 100 accordingly is received within the keyway 108 formed within the valve body 94 for rotative coupling of the sleeve 98 with the valve body 94 in the direction indicated by arrow 110 in FIGURE 7. A sealing bearing 112 is therefore also provided and disposed between the actuating gear 114 and the upper axial end of the valve body 94. Operation of the valve mechanism illustrated in FIGURES 6 through 8 with regard to the sealing provided between the valve body and the cylindrical bore of the valve housing, is the same as described with respect to FIGURES 1 through 4. The arrangement of FIGURES 6 through 8 however serves a purpose which differs from the combustion chamber control provided by the valve mechanism described with respect to FIGURES 1 through 4. The valve assembly 80 is arranged to provide unrestricted fluid flow between the inlet 82 and outlet 84.

FIGURE 9 illustrates a modified form of split sleeve generally referred to by reference numeral 116 for installation on a valve body 118 within the valve housing 120. The valve body 118 includes the port 122 aligned with the opening 124 formed in the split sleeve 116. The split sleeve includes overlapping portions 126 and 128 with the inner overlapping portion 128 folded to form the key formation 130 disposed at the slight angle to the radial direction as described with respect to the sleeves 64 and 98. The key formation 130 is therefore similarly loosely received within a keyway 132 formed within the valve body 118. The valve body also is formed with a recess portion 134 extending in one direction from the keyway 132 for receiving the overlapping portion 128 of the sleeve 116. The opening 124 is slightly larger than the port opening 122 in the valve body so as to avoid any reduction in the opening of port 122 because of thermal or rotative deformation of the sleeve. The opening 124 is therefore partially cut through the overlapping portions 128 and 126 of the sleeve. The key formation 130 in the case of the sleeve 116 will therefore not only carry the sleeve with the valve body by virtue of force applied thereto through the keyway, but will also accommodate expansion of the sleeve and hence replaces the separated gap as described with respect to sleeves 64 and 98 in the previously described sleeve installations.

FIGURE 10 illustrates a further modification wherein the split sleeve 134 is keyed to the valve body 136 rotatable within the valve housing 120 by means of a recess 138 formed in the valve body 136 at the port opening 140. The port opening 142 in the sleeve 134, is therefore formed through an inwardly projecting annular flange 144 which is loosely received within the recess 138. Accordingly, force is applied to the sleeve 134 by the valve body when the edge 146 of the recess 138 engages the pulling edge of the flange 144 as illustrated in FIGURE 10. The split gap 148 of the sleeve 134 is therefore located adjacent to but forwardly of the edge 150 of the body recess 138. The port opening 142 in the sleeve 134 as hereinbefore indicated with respect to sleeve 116 in FIGURE 9 is slightly larger than the port opening 140 in the valve body so that expansion and contraction accommodated by the sleeve 148 will not obstruct the port opening 140 since both expansion and contraction will occur adjacent that portion of the sleeve at which driving force is applied. Accordingly, in the latter modification, pulling of the sealing sleeve 134 by the valve body occurs at the port opening with expansion and contraction being accommodated by the split 148 located forwardly of the port in the direction of valve movement. The latter arrangement differs from that of the modification illustrated in FIGURE 9 in that the flange 144 will prevent flow of gases from the valve body chamber into the annular space between the sleeve and valve body and further involves the pulling of the split sleeve at the port opening itself without a separate key formation. The first described split sleeve arrangements 64 and 98 of course involve pulling by integrally formed keys which form the leading edge of a split gap in the sleeve all arranged rearwardly of the port opening in the sleeve as illustrated in FIGURE 5 so that the inclination of the key from the radial direction is in a direction opposite to that of FIGURE 9.

FIGURE 11 illustrates a still further modification in which features of the previously described modifications are combined. Accordingly, the valve housing 120 in FIGURE 11 seats the valve body 152 having a port opening 154 which communicates with a recess 156 formed in the valve body loosely receiving an annular flange 158 of the split sleeve 160. Unlike the inwardly projecting flange as described with respect to the split sleeve 134 in FIGURE 10, pulling of the sleeve 160 is accomplished by a key formation 162 formed in the sleeve 160 rearwardly of the port opening 164 thereof which is loosely received within the keyway 166 in the valve body 152. The key formation and keyway as illustrated in FIGURE 11 is therefore disposed at a slight angle to the radial direction on the same side as that of FIGURE 5. Expansion and contraction of the split sleeve 160 is accommodated by the spacing between the key formation 162 and the overlapping portion 168 of the sleeve which overlaps the other portion 170 extending forwardly from the key formation 162. The port opening 164 of the sleeve is therefore formed through part of the overlapping portions 168 and 170, the portion 170 being formed integral with the inwardly projecting flange 158. Also, a recess 172 is formed in the flange 158 for loosely receiving therewithin the overlapping portion 168. It will therefore be apparent, that pulling of the sleeve occurs just forwardly of the port opening in the direction of movement of the valve body, the angular inclination of the key and keyway being such as to cause distortion forwardly thereof rather than rearwardly thereof as in the modification of FIGURE 9. It will also be apparent that the clearance between the flange 158 and the valve body recess 156 must exceed that of the recess 166 so that pulling will not occur at the flange 158.

From the foregoing description, operation and utility of the invention will be apparent. It will therefore be appreciated that the rotary valve mechanism of the present invention includes various advantageous features by means of which atuomatic sealing is effected with unexpected efficiency and great economy. Also as a result of the novel sealing device, non-restrictive flow through the rotary valve may be accommodated and due to the free riding of the split sleeve on the inner housing bore surface, lubrication of the valve is simplified. The above noted advantages are achieved and are more widely applicable to different installations by virtue of the fact that the automatic sealing effect is accomplished with full and continuous rotation of the rotary valve regardless of the speed thereof. Also, by virtue of the novel relative locations of the key, gap and port opening on the split sleeve, locking of the sleeve against the housing bore is prevented without relieving the sealing pressure thereof. Furthermore, the relative location of the port opening in the sleeve enhances the self-sealing effect as hereinbefore indicated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-sealing rotary valve mechanism comprising, a rotatable valve body, housing means rotatably receiving said valve body, valve actuating means operatively connected to one axial end of the valve body for imparting continuous rotation thereto in one direction only, port means formed in said housing means, chamber means formed within said valve body and having a passage for non-restrictive flow of fluid to and from said port means, a split, elastically deformable sleeve subject to the static pressure of said fluid and continuously biased into seal-in relation with the housing means, torque transmitting means connected to the sleeve and projecting radially inwardly therefrom for operative engagement by the valve body to elastically deform the sleeve out of binding contact with the housing means in response to rotation of the valve body in said one direction only without relieving the sealing bias applied to the sleeve, said sleeve being formed with an opening aligned with said passage and spaced from said torque transmitting means.

2. The combination of claim 1, wherein said sleeve includes a longitudinal leading edge and a trailing edge with respect to direction of rotation defining a gap therebetween, said gap being spaced and separate from the opening formed in the sleeve to provide free flow of fluid between the chamber means and the port means in angularly spaced relation to the gap.

3. The combination of claim 2, wherein said torque transmitting means comprises a key connected to the split sleeve along the leading edge thereof and received within a longitudinal keyway extending from said one axial end of the valve body terminating adjacent to but spaced from the other axial end of the valve body.

4. The combination of claim 3, including sealing bearing means disposed between said one axial end of the valve body and the actuating means operative to maintain the sealing bias of the split sleeve when the chamber means is pressurized.

5. The combination of claim 1, wherein said torque transmitting means comprises a key connected to the split sleeve and received within a longitudinal keyway in the valve body extending from said one axial end thereof terminating adjacent to but spaced from the other axial end of the valve body.

6. The combination of claim 1, including sealing bearing means disposed between said one axial end of the valve body and the actuating means operative to maintain the sealing bias of the split sleeve when the chamber means is pressurized.

7. The combination of claim 1, wherein said chamber means comprises an unrestricted fluid flow passage in constant communication with an inlet passage and periodically communicating with said port means.

8. A self-sealing valve assembly comprising, ported housing means, rotatable valve means rotatably received within the housing means, fluid flow chamber means formed in the valve means, elastically deformed sealing means disposed in chamber sealing relation between the valve means and the housing means, gap means formed in the sealing means for accommodating limited deformation thereof, means operatively mounting the sealing means on the valve means for free movement relative to the housing means while in sealing relation thereto in response to continuous rotation of the valve means in one direction and pressurization of the chamber means, said sealing means including passage means angularly spaced from said gap means for providing unrestricted fluid communication from the chamber means under all deformed conditions of the sealing means.

9. The combination of claim 8, wherein said sealing means comprises an elastically deformable sleeve having a leading edge and a trailing edge defining an axially extending gap in the sleeve, and a sealing bearing disposed in sealing relation to one axial end of the sleeve and valve means, said mounting means including a radially projecting key integrally formed along the leading edge of the sleeve to present a pulling edge received within a keyway in said valve means extending from said one axial end of the valve means and terminating adjacent to but spaced from the other axial end.

10. A self-sealing device for a valve rotatable about a fixed axis within a valve housing and having at least one port therein comprising, elastically deformable sleeve means pre-tensioned for biased sealing engagement with the valve housing, key means formed on the sleeve means and projecting inwardly therefrom, means on the valve for loosely receiving the key means for rotation of the sleeve means with the valve by application of a force tending to deform the sleeve means out of binding contact with the housing, gap means formed in the sleeve means for accommodating any deformation of the sleeve means by said force and by thermal effects, and passage means disposed in spaced relation to the gap means for fluid communication with said one port.

11. The combination of claim 10, wherein said passage means includes a port opening in the sleeve means dimensionally exceeding said one port and located adjacent to but spaced forwardly of the key means in the direction of rotation of the valve.

12. The combination of claim 11, wherein said gap means is formed by overlapping portions of the sleeve means.

13. The combination of claim 12, wherein said port opening means extends partially through said overlapping portons.

14. The combination of claim 13, wherein said port opening means includes inwardly projecting flange means defining a port opening in the sleeve means loosely received within a recess in the valve formed about the port therein.

15. The combination of claim 10, wherein said gap means comprises a split separation in the sleeve means located adjacent to and forwardly of the key means.

16. The combination of claim 15 wherein said key means includes inwardly projecting flange means defining a port opening in the sleeve means loosely received within a recess in the valve formed about the port therein.

17. The combination of claim 10, wherein said gap means is formed by overlapping portions of the sleeve means.

18. The combination of claim 17, wherein said sleeve means includes a port opening means located adjacent to but rearwardly of the key means in the direction of rotation of the valve.

19. The combination of claim 10, wherein said passage means includes a radially projecting flange forming a passage between said one port and accommodating deformation of the sleeve means relative to the valve, said passage being dimensionally greater than said one port for complete and continuous exposure thereof under any relative deformation between the sleeve means and the valve.

References Cited in the file of this patent

UNITED STATES PATENTS

| 2,105,331 | Rasmussen | Jan. 11, 1938 |
| 2,222,059 | Monleone | Nov. 19, 1940 |
| 2,511,477 | Mueller | June 13, 1950 |

FOREIGN PATENTS

| 284,372 | Germany | Apr. 10, 1913 |
| 540,695 | Great Britain | Oct. 27, 1941 |